Dec. 12, 1933.  E. A. NEWTON  1,939,610
STABILIZER FOR VEHICLES
Filed Aug. 17, 1931

Inventor
Edward Albert Newton
By B. Singer
atty.

Patented Dec. 12, 1933

1,939,610

UNITED STATES PATENT OFFICE 1,939,610

STABILIZER FOR VEHICLES

Edward Albert Newton, Sevenoaks, Kent, England

Application August 17, 1931, Serial No. 557,669, and in Great Britain August 18, 1930

5 Claims. (Cl. 267—11)

This invention relates to a stabilizer for vehicles, that is, to means for distributing the load pressure or other forces tending to cause the vehicle to lean over with respect to the axles of the vehicle.

The primary object of the invention is the provision of pivotal link mechanism connected preferably to symmetrical parts of a vehicle frame and the axles thereof whereby the pressure exerted on a part or parts is distributed throughout the vehicle.

A further object of the invention is the provision in a link mechanism that distributes the load pressure of resilient couplings or joints that take up relative movements occurring between the members of the link mechanism and absorb shock.

A further object of the invention is the provision in a joint or joints of the link mechanism of restraining devices such as friction elements that prevent too easy relative movements between joints of the link mechanism.

The above and other objects of the invention will be clearly understood from the following description taken in conjunction with the accompanying drawing and the claims.

Figure 1:
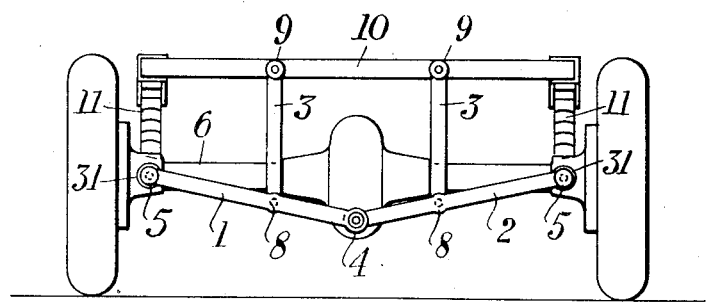
Fig. 1 is an end view of a rear axle assembly for a motor vehicle, to which assembly a linkage according to the invention has been applied.
Figure 2:
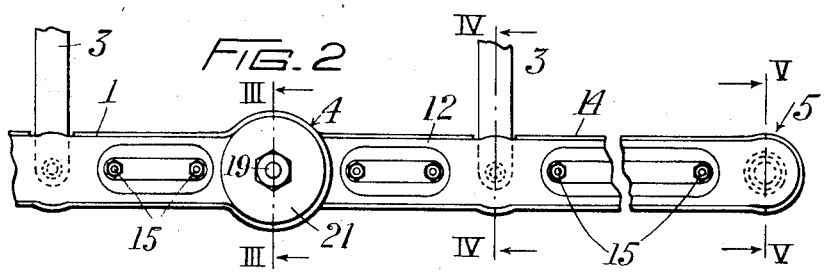
Fig. 2 is a view on a larger scale of part of the linkage illustrated in Fig. 1.
Figures 3, 4, 5:
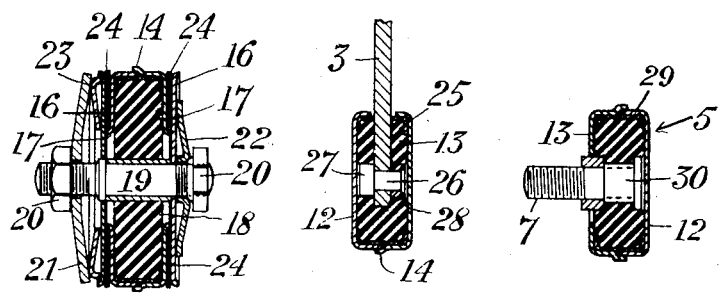
Fig. 3 is a sectional side view to a larger scale taken on the line III—III of Fig. 2.
Fig. 4 is a side sectional view taken on the line IV—IV of Fig. 2, the scale being enlarged.
Fig. 5 is a side sectional view to an enlarged scale on the line V—V of Fig. 2.

In the drawing the linkage comprises two arms 1 and 2 and two thrust rods 3—3. The arms are connected together at their inner ends by means of a resilient knuckle joint 4, are attached at their outer ends 5 to the outer ends of the axle 6 by means of studs 7 and are connected intermediate their ends at 8—8 with the rods 3—3.

With this arrangement if one side of the vehicle be loaded unequally with respect to the other side, one of the rods 3 connected at 9 to a cross member 10 of the chassis frame is depressed against the action of a spring 11 and turns its appropriate arm on a stud 7. A substantially similar turning movement is imparted through the joint 4 to the other one of the arms which, through the rod and the joints 8 and 9 pulls down the less heavily loaded side in conformity with the depression of the more heavily loaded side and thus the vehicle is stabilized.

It will be understood that the linkage operates in substantially converse fashion when a load is taken from one side, a spring 11 tending to raise the unloaded side.

In addition to the linkage acting to stabilize the vehicle when unevenly loaded, the linkage eliminates wholly or mainly swaying of the vehicle when turning corners and greatly minimizes tendency towards skidding or side slipping.

The arms 1 and 2 are constructed each from pressed steel channels 12 and 13 arranged cavity to cavity with edges 14 on 13 overlapping the adjacent edges of 12, and secured together along their lengths by bolts and nuts 15.

The inner ends 16—16 of the member 1 are enlarged to provide the socket or fork of the knuckle joint 4 and the corresponding ends 17—17 of the arm 2 are formed to provide a substantially cylindrical case that completes the other part of the knuckle and receives an annular block 18 of india-rubber.

The parts of the knuckle joints are secured together by a bolt 19 on the ends of which are nuts 20 adapted when screwed up to force two dished washers 21 and 22 arranged one adjacent one nut and one adjacent the other nut towards each other. The washer 22 bears directly against one of the parts 16 and between the washer 21 and the other part 16 is a spring washer 23. Hence when the washers are forced towards each other the parts 16 and 17 at each side of the block 18 are pressed into close engagement with friction rings 24 interposed between them.

The friction rings have a damping effect on relative movements occurring between the parts of the joint and the block 18 renders the joint resilient in that it actually forms the connection between the pin 19 that is virtually rigid with the parts 16 and the parts 17.

The connection between each thrust rod and its arm consists of an annular block 25 of india-rubber that is gripped between the channel members 12 and 13 and has passed through it a stud 26 that passes also through an opening in the lower end of the rod 3.

The head 27 of the stud at one side of the rod and a sleeve 28 on the stud at the other side of the rod convey the thrust or pull of the rod to the india-rubber which in turn affects the arm in which it is clamped.

The connection between the end of each arm and the appropriate end of the axle consists of the stud 7 and a block of india-rubber 29 through the centre of which the stud passes and which is gripped between the channel members 12 and 13.

The stud is surrounded by a sleeve 30 where it engages the india-rubber block. The stud screws into a flange 31 on the vehicle axle and limited movement between the stud and the arm is possible in virtue of the resiliency of the block and a clearance hole for the stud being provided in the channel 13.

Figure 6:
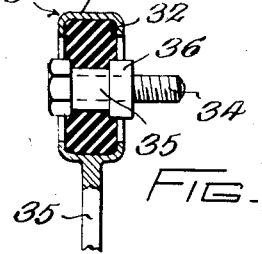
Fig. 6 is a detail sectional view of the pivotal connection between one of the rods and the chassis frame.

The connections 9 are resilient as shown in Fig. 6. The thrust rod 3 terminates in an annular head 31 of trough like cross section. The annulus receives an annular cushion comprising a circular block 32 of india rubber or a number of segmental rubber blocks. A fixing bolt 34 passes centrally through the india rubber cushion and screws into the cross member 10 of the chassis frame, said bolt being surrounded by a spacing sleeve 35 and having a spacing collar 36 adjacent one end of the said sleeve. It will be understood that the india rubber cushion 32 acting in conjunction with the annulus 31 and the sleeve 35 and bolt 34 provides a resilient connection or joint between the chassis frame and the upper end of the thrust rod.

What I claim is:—

1. A stabilizer for vehicles, comprising two arms pivotally and resiliently connected together at their inner ends, means at the outer ends of the arms for pivotally connecting them to a vehicle axle and to rods each pivotally connected at the upper end to the vehicle frame and pivotally connected at the lower end to one of the arms at a point intermediate the ends thereof, said arms and said rods coacting to transmit lowering or raising tendencies of either side of the vehicle body to the other side, each of the two arms consisting of two elements of channel section arranged cavity to cavity and means securing said elements together, and said arms being formed with a knuckle joint connecting their inner ends together, said joint including a substantially cylindrical casing, a cushioning block in said casing, a central cylindrical member extending through the center of said cushioning block and a pivot bolt extending through said central cylindrical member.

2. A stabilizer for vehicles, as claimed in claim 1, including discs on opposite sides of the knuckle joint, friction rings between said joint and said discs and dished washers on the bolt and bearing against the outer sides of said discs.

3. A stabilizer for vehicles in which raising or lowering tendencies of either side of the vehicle body are transmitted to the other side, consisting in two arms each articulated to the other at one end and connected at its other end to the axle of the vehicle, rods connecting said arms at points intermediate their ends to the frame of the vehicle, each arm comprising two elements of channel section arranged cavity to cavity and containing in the cavities a resilient joint for connecting the arm to one end of said rods and another resilient joint for connecting the arm to the axle.

4. Stabilizer according to claim 3, in which said resilient joints comprise resilient blocks and stud members passing through the blocks, said stud members, in the case of the rods, passing through one end of each of said rods, and in the case of the connection to the axle, passing through said blocks and projecting into a part rigid with the axle.

5. Stabilizer for vehicles according to claim 3, in which said resilient joints comprise resilient blocks and stud members passing through the blocks, said stud members, in the case of the rods, passing through one end of each of said rods, and in the case of the connection to the axle, passing through said blocks and projecting into a part rigid with the axle, the articulation between said arms comprising a knuckle joint that includes a substantially cylindrical casing, a cushioning block in said casing, a central cylindrical member extending through the center of said cylindrical block and a pivot bolt extending through said central cylindrical member.

EDWARD ALBERT NEWTON.